United States Patent [19]

Plamper

[11] 4,203,276
[45] May 20, 1980

[54] LAWN MOWER AND GRASS CATCHER

[75] Inventor: Gerhard R. Plamper, Valley City, Ohio

[73] Assignee: MTD Products Inc., Cleveland, Ohio

[21] Appl. No.: 931,768

[22] Filed: Aug. 7, 1978

[51] Int. Cl.² .............................................. A01D 35/22
[52] U.S. Cl. ........................................ 56/202; 56/16.6
[58] Field of Search ............... 56/202, 16.6, 203, 205, 56/206

[56] References Cited

U.S. PATENT DOCUMENTS

| | | | |
|---|---|---|---|
| 3,893,284 | 7/1975 | Thon et al. | 56/202 |
| 3,928,956 | 12/1975 | Boyer | 56/202 |
| 3,949,540 | 4/1976 | Christopherson et al. | 56/202 |

*Primary Examiner*—Russell R. Kinsey
*Attorney, Agent, or Firm*—Woodling, Krost & Rust

[57] ABSTRACT

A mower and grass collector, the mower having a closure over its discharge port for opening and closing the port in accordance with the mounting of the grass collector on the mower housing, the closure being spring biased to a closed position and being swingable forwardly and downwardly in the housing by operating means carried by the collector and intrudable into the housing through the port to press open the closure upon mounting of the collector on the mower housing.

11 Claims, 6 Drawing Figures

LAWN MOWER AND GRASS CATCHER

BACKGROUND OF THE INVENTION

My invention is related to lawn mower and grass catcher of the same general type shown in U.S. Pat. No. 3,893,284 and is directed to an improvement of the same.

An object of my invention is to provide for improved closure means for the discharge port of the mower and improved means for operating the closure between opened and closed positions.

Another object is the provision of a closure for a rear-discharge port of a lawn mover which closure is mounted to be biased to upright closed position at the port and is operable to swing on a pivot carried by the mower inwardly and downwardly in the mower housing upon overcoming of the bias to open the discharge port.

Another object of the invention is to provide that upon the closure at the discharge port being moved to open the discharge port any cut grass blown against the closure on the inside of the mower housing is thrown downwardly and toward the interior of the housing to minimize the clogging of the discharge port with cut grass and to increase the effectiveness of the closure in opening and closing the discharge port.

Another object is to increase the ease and efficiency of operating the closure at the discharge port of a mower housing by an improved grass catcher mountable to the mower at the discharge port to receive cut grass discharged through the discharge port.

Another object is to provide structure in a mower and in a grass catcher to provide a unique and efficient operation between the mower and grass catcher for the operation of the closure between open and closed positions to assure safety and efficiency.

Other objects and a fuller understanding of my invention may be had by referring to the accompanying drawings in which like parts are designated by like reference characters and in which.

Figure 1:
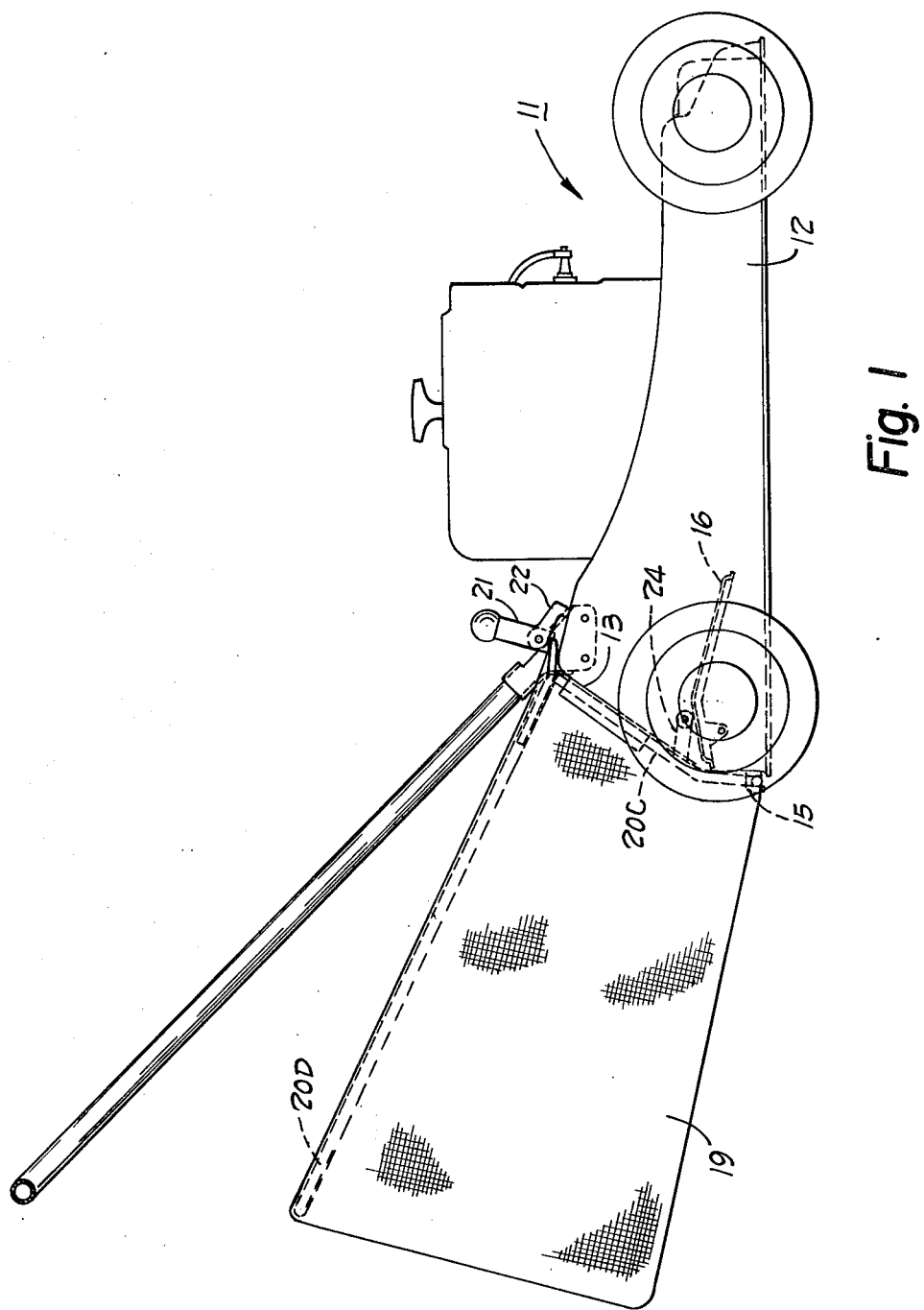
FIG. 1 is a side view of a preferred form of my invention and showing the improved and novel combination of mower and grass catcher.
Figure 2:
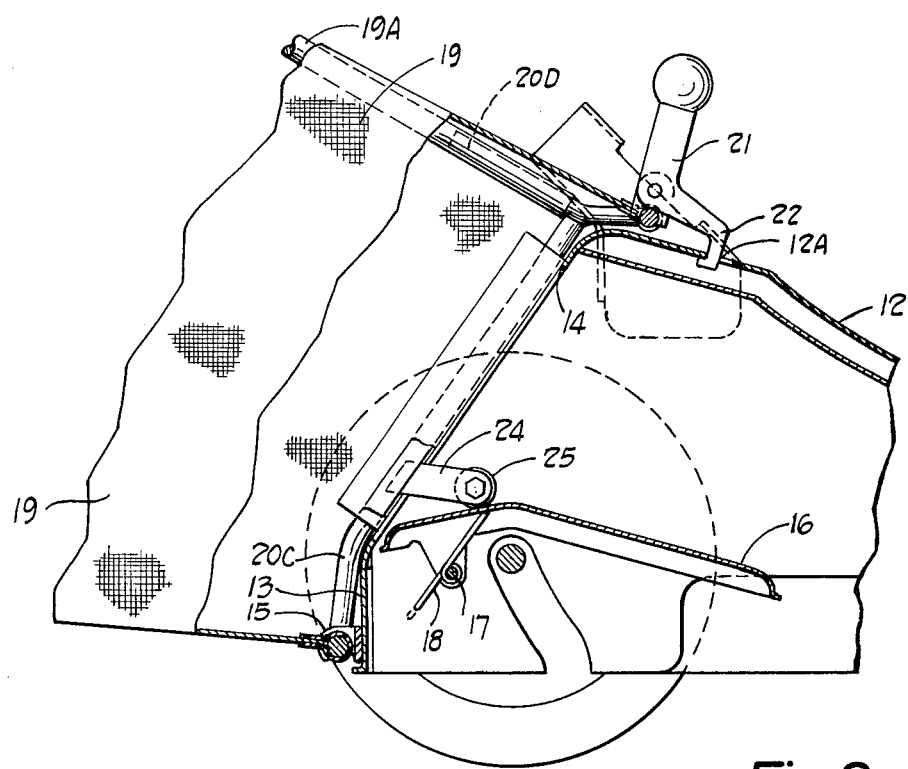
FIG. 2 is an enlarged sectional view showing details of the rear portion of the mower and forward portion of the grass catcher mounted on the mower, of the preferred form of my invention shown in FIG. 1.
Figure 3:
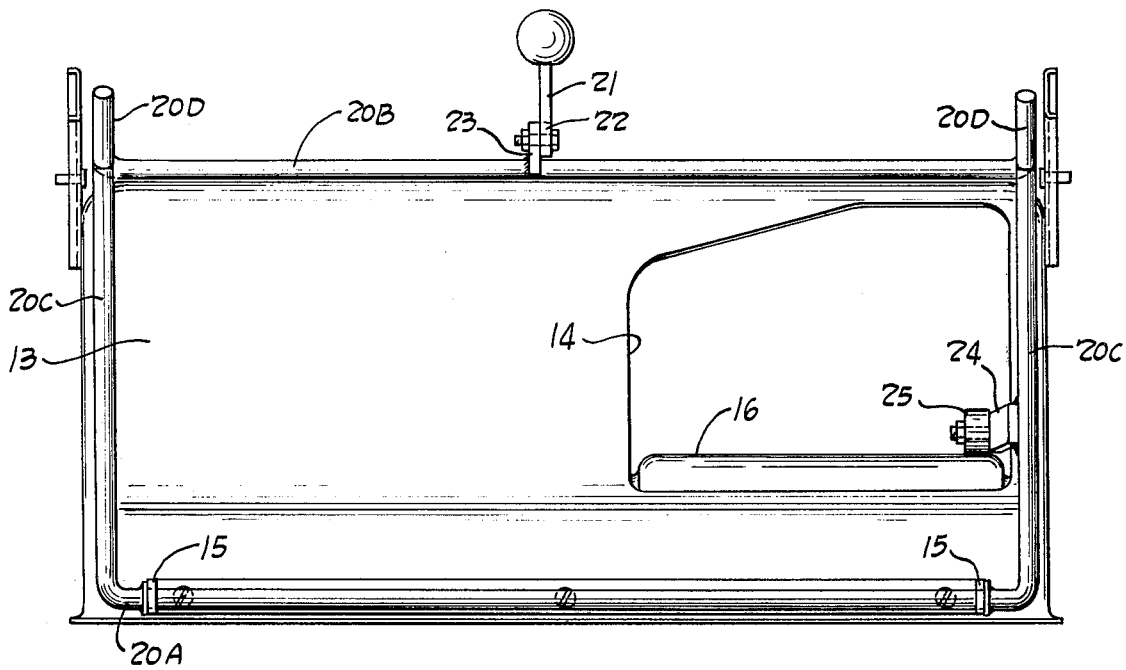
FIG. 3 is an enlarged view showing the rear end of the mower and forward end of the grass catcher mounted on the mower, of the preferred form of my invention shown in FIG. 1 and 2.

The preferred form of my invention shown in FIGS. 1, 2 and 3 is described first. A rotary type lawn mower is indicated by the reference character 11, having the usual cutting blades in the mower housing 12 drivable by an engine mounted on the housing in the usual manner.

The housing 12 has a rear wall 13 extending downwardly from the upper deck of the housing 12 which also has walls enclosing the sides thereof as usual for such mowers. This rear wall 13 has a discharge port 14 extending therethrough at one side of the rear wall as better seen in FIG. 3. Grass cut within the housing by the cutting means and blown thereby in the usual manner of rotary cutting means is blown rearwardly from the housing through the port 14.

A closure or door 16 is hingedly mounted on the mower housing 12 to open and to close the port 14 upon operating of the closure. A pivot connection 17 carried by the housing 12 provides a pivotal mounting for closure 16 to permit it to swing downwardly and forwardly into the housing to the position shown in the drawings whereby the discharge port 14 is then open to permit grass clippings to be blown outwardly of the housing through the port.

A spring 18 wound around the pivotal mounting 17 and having one end extending out and anchored to the housing 12 and the opposite end extending out and anchored to the closure 16, biases the door to swing rearwardly and upwardly to the plane of the rear wall 13 and thus to close the port 14. Thus, the closure 16 is normally biased to its closed position.

A grass collector 19 is mountable on the rear of the housing 12 to receive grass clippings blown outwardly through the port 14. The grass collector 19 has a body of porous fabrics or other porous material which permits air to escape therefrom but which traps and collects the grass clippings therein.

The collector 19 has an open rectangular frame to which the fabric material is secured to provide a mouth registrable with the rear end of the mower housing and through which grass clippings may enter the interior of the collector. This frame comprises a lower horizontally disposed bar on rod 20A, an upper horizontally disposed bar or rod 20B, two spaced side bars 20C to complete the rectangle as seen in FIG. 3. At the upper corners of the frame rearwardly projecting portions 20D are disposed to support two spaced rearwardly extending supporting bars 19A which carry the porous material suspended therefrom.

The frame carries rigidly mounted on one of the two side bars 20C an operating arm 24 which extends forwardly to protrude through the discharge port into the housing so as to engage the rear outer surface of the closure 16. The free end of the arm has pivotally mounted thereon a roller 25 which makes rolling engagement with the near surface of the closure 16 so as to expedite the swinging movement of the closure 16 in response to pressure imposed on the closure 16 by the movement of the operating arm 24.

As seen in the drawings, when the collector frame is mounted to the mower housing, the roller 25 on forwardly extending arm 24 contacts the closure 16 which is then pressed downwardly and forwardly on the pivot connection 17 against the bias of spring 18 and is held in this position to keep the port 14 open while the collector is mounted in place on the mower housing. However, upon removal of the collector from the mower housing the operating arm 24 with its roller 25 are withdrawn from the housing through to port 14 and this causes the bias of spring 18 to swing the closure upwardly and rearwardly to a plane coinciding with rear wall 13 and thus closing the port 14.

In the preferred form of my invention shown in FIGS. 1, 2 and 3, the mounting of the collector 19 is accomplished by providing near the lower edge of rear wall 13 a pair of laterally spaced downwardly directed hooks 15 and the lower bar or rod 20A of the frame is hooked upwardly and into these hooks 15 as seen in FIGS. 2 and 3. The lower bar or rod 20A when disposed in the hooks 15 provides a hinge connection for the pivotal swing of the collector about the axis of bar or rod 20A in the hooks 15.

The upper portion of the collector frame is detachably securable to the housing 12 by means of a hook 22 pivotally carried on a mounting 23 rigidly secured to the upper bar or rod 20B of the collector frame intermediate of the ends of the bar or rod 20B. This hook 22 is manually swung into and out of locking position by a lever portion 21 extending at an angle from the hook 22. The hook is swung on the pivot provided by mounting 23. A rectangular opening 12A is provided in the upper deck of the housing near the rear wall 13, this opening 12A permitting the hook 22 to enter the same and to thus lock the upper portion of the collector frame to the housing 12.

In the preferred form of my invention shown in FIGS. 1, 2 and 3 the collector 19 is mounted on the housing 12 by hooking the lower bar or rod 20A under the hooks 15 and swinging the collector 19 upwardly and forwardly to where the hook 22 may be inserted into the opening 12A of the housing for locking the collector to the housing. This provides that the operating arm 24 with its roller 25 is maintained in position to keep the closure 16 in open position.

Figure 4:
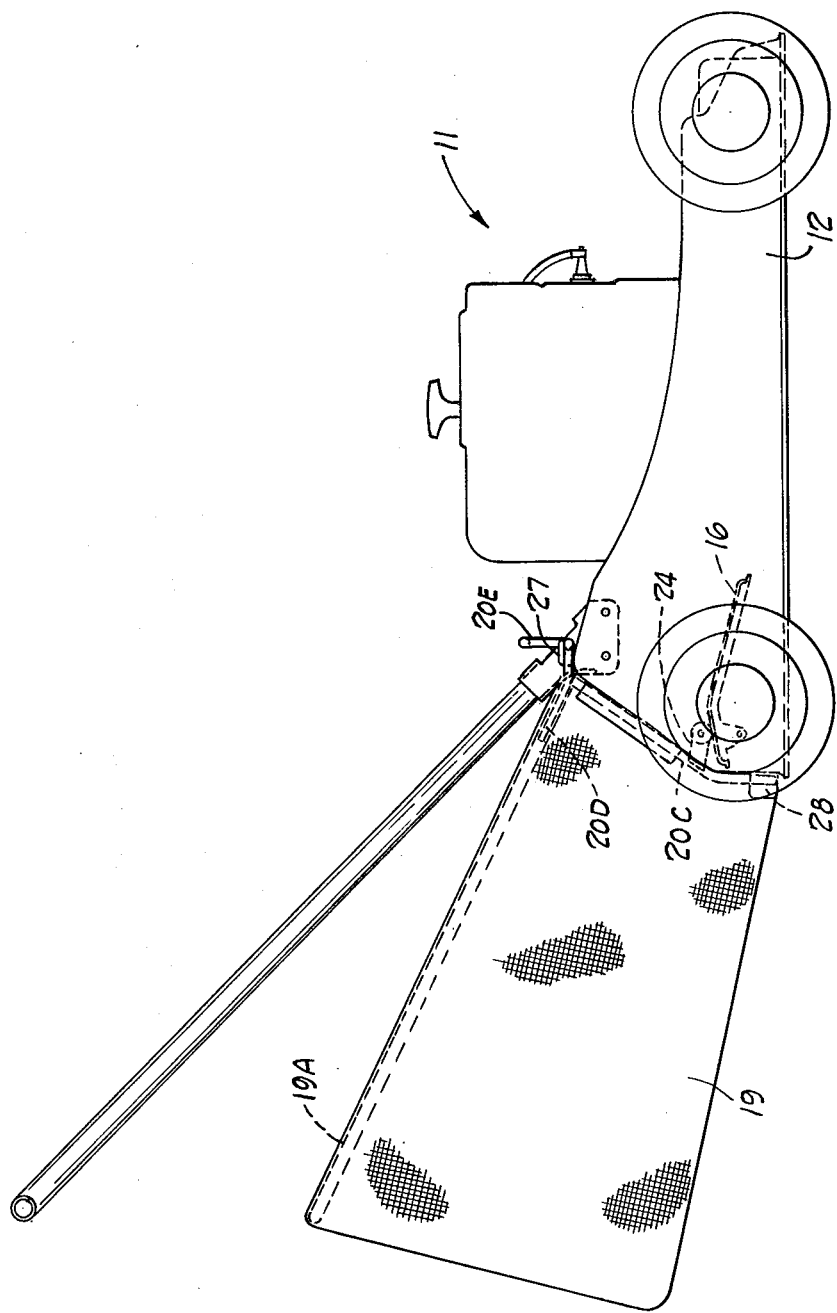
FIG. 4 is a side view of a modified form of my invention and showing the improved and novel combination of mower and grass catcher.
Figure 5:
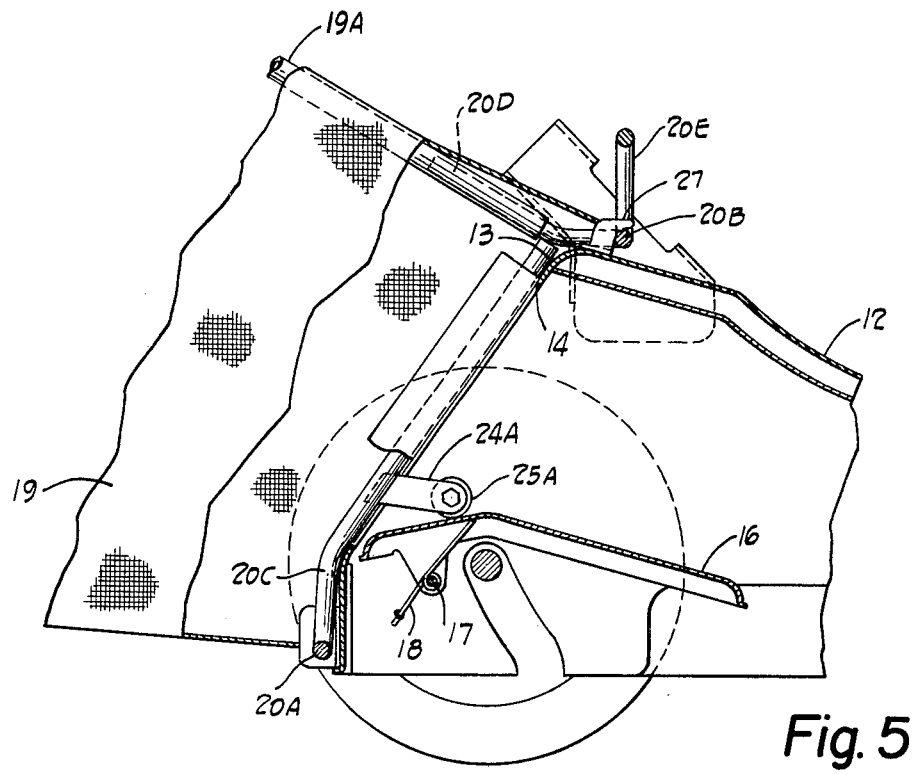
FIG. 5 is an enlarged sectional view showing details of the mower and forward portion on the catcher, of the modified form of my invention shown in FIG. 4.
Figure 6:
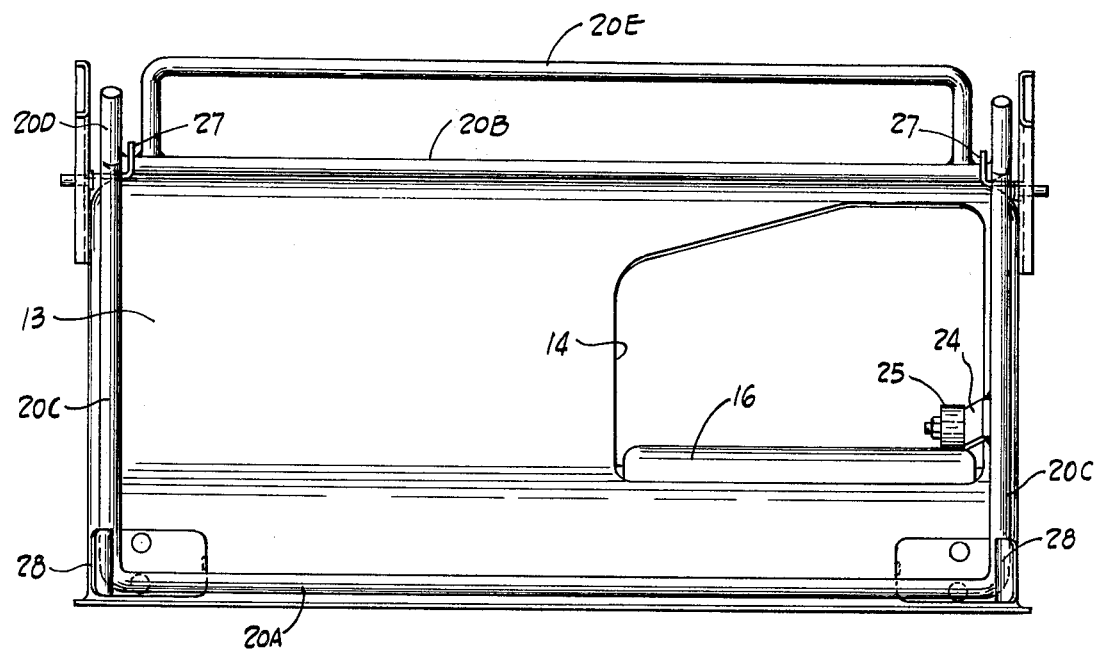
FIG. 6 is an enlarged view showing the rear end of the mower and forward end of the grass catcher mounted on the mower, of the modified form of my invention shown in FIGS. 4 and 5.

In the modified form of my invention shown in FIGS. 4, 5 and 6 the mower housing 12 is the same as the housing 12 in the preferred form of the invention except that the opening 12A in the top deck of the housing 12 has been omitted. The rear wall 13, the discharge port 14, the closure 16, its pivotal mounting 17 and biasing spring 18 are the same as in the preferred form of the invention.

In the modified form of the invention of FIGS. 4, 5 and 6, the operating arm 24 with its roller 25 is carried by a side bar or rod 20C of the collector frame, and the movement of the closure 16 in response to the pressure from the arm 24 and roller 25 on closure 16 are the same as described in connection with the preferred form shown in FIGS. 1, 2 and 3.

In the modified form of the invention shown in FIGS. 4, 5 and 6 the mounting of the collector 19 differs from the mounting of the collector 19 in the preferred form of the invention in the following particulars. Two laterally spaced downwardly directed hooks 27 are mounted on the housing 12 near the upper portion of rear wall 13. The upper bar or rod 20B of the collector 19 is hooked under these hooks 27 whereby the bar or rod 20B engaged in the hooks 27 provides a hinged connection between the collector and the housing 12 near the upper portion of rear wall 13.

To detachably hold the bottom of the collector frame to the housing 12 near the bottom of the rear wall 13 a pair of laterally spaced spring clips are mounted on the rear wall near the bottom and outer corners of the same. These spring clips 28 are positioned and disposed so that upon downward swinging of the collector frame upon the hinged connection provided by upper hooks 27 the two side bars 20C of the collector frame resiliently snap into and are held by the clips 28 to anchor the collector to the housing. When it is desired to remove the collector from the housing the collector is swung upwardly to overcome the bias of the resilient clips 28 and thus disconnect the collector frame from the housing. The collector may then be moved downwardly so as to become disengaged from the upper hooks 27.

To aid in handling and manipulating the collector in the modified form of FIGS. 4, 5 and 6 a handle portion 20E is added to the frame. This handle portion 20E is secured to upper bar 20B of the frame and parallels it for ready grasping of the handle portion 20E.

In both the preferred form and modified form of the invention the operating arm, with its roller 25, is carried on the collector frame and operates the spring-biased closure or door 16 in the same manner. Safety and ease of operation are enhanced by this unique combination of parts providing this new function.

Although this invention has been described in its preferred form with a certain degree of particularity, it is understood that the present disclosure of the preferred form had been made only by way of example and that numerous changes in the details of construction and the combination and arrangement of parts may be resorted to without departing from the spirit and the scope of the invention as hereinafter claimed.

What is claimed is:

1. In a lawn mower having grass cutting means, a housing for the grass cutting means, the housing having a wall and a discharge port in said wall through which cut grass is discharged outwardly of the housing, the combination of a movable closure carried by the housing for blocking said discharge opening when in closed position and for opening said discharge port when in opened position, said closure being hingedly connected to the housing adjacent to lower edge portion of the closure and being biased to swing upwardly and rearwardly to a generally upright position to close said discharge port and to swing downwardly and forwardly into said housing upon overcoming of the said bias, a collector for collecting cut grass discharged through said discharge port upon being mounted upon the said housing adjacent the said discharge port to receive cut grass blown by the cutting means through the discharge port when the discharge port is open, and an operating arm carried by the collector and extending forwardly therefrom to protrude into said discharge port upon the mounting of the collector on the said housing and to press against the said closure to cause the closure to swing in opposition to said bias downwardly and forwardly into the housing for opening said discharge port.

2. The combination claimed in claim 1 and in which the collector upon being mounted upon the said housing is hooked near the bottom edge portion of said housing wall for providing a pivot connection for the collector to be swung upwardly to a position to receive cut grass blown by the cutting means through the discharge port, and in which the collector upon being mounted to the housing is secured to the housing in such position for maintaining the said operating arm pressed against the closure and the closure maintained in opened position.

3. The combination claimed in claim 2, including downwardly directed hook means carried by the housing and rod means carried by the collector, and in which the pivot connection for the collector is provided by said downwardly directed hook means carried by the said housing and by said rod means carried by the collector adapted to be hooked upwardly into said hook means, and a securing member carried pivotally by the collector at a distance upwardly from said rod means, said securing member having a forward portion adapted to engage said housing for holding the collector to the housing and a lever arm portion manually movable to pivotally swing the securing member between a position in which the forward portion engages the housing to lock the collector to the housing and a position in which the forward position disengages the housing to permit the collector to be swung on its pivotal connection away from the housing.

4. The combination claimed in claim 1 and including pivot means carried by the said housing wall near the bottom edge thereof adapted to engage the forward lower portion of the collector to permit the collector upon being swung on the pivot means upwardly toward the housing to cause said operating arm to press against and open said closure, and a securing member carried by the forward upper portion of the collector adapted to engage the housing for holding the collector upwardly toward the housing to maintain the closure in opened position, the said securing member being manually movable to disengage the housing and to permit the collector to be swung downwardly away from the housing to permit the closure to be moved to closed position.

5. The combination claimed in claim 1 and in which the collector has a forward opening and includes a frame at the said forward opening of the collector adapted to be positioned adjacent the said wall of the housing to permit cut grass blowing rearwardly through the discharge port into the collector, and including hinge means mounted to the said wall of the housing and to the collector frame near the bottom portion of the frame, and including securing means mounted to the collector frame near the upper portion of the frame and adapted to engage the housing for holding the frame swung upwardly on the hinge means to the housing and for permitting the frame to swing downwardly on the hinge means upon disengagement of the securing means from the housing.

6. The combination claimed in claim 1 and in which the collector is adapted to be hooked near the upper edge portion of the housing wall for providing a pivot connection for the collector to be swung downwardly to a position to receive cut grass blown by the cutting means through the discharge opening, and in which the collector is adapted to be secured to the housing in such position for maintaining the said operating arm pressed against the closure maintained in opened position.

7. The combination claimed in claim 6, including resilient releasable clip means carried by the housing, the collector including an engaging portion and in which the pivot connection for the collector is provided by upwardly directed hook means carried by the said housing and by rod means carried by the collector adapted to be moved downwardly into engagement with said hook means, and in which the collector is secured to the housing by the said engaging portion of the collector at a distance downwardly from said pivot connection engaging with the said resilient releasable clip means carried by the housing adjacent the lower edge portion of said housing wall.

8. In a mower having a mower housing, the housing having a wall, the wall having a discharge port, and a closure for the port, the improvement of means pivotally connecting the lower edge portion of the closure to said housing in position for closing and opening said port, biasing means carried by the housing for urging said closure to swing upwardly and rearwardly to a generally upright position to close said port, and a collector mountable on the housing for collecting cut grass blown through the discharge opening, said collector having an operating arm extending forwardly therefrom and into said port upon being mounted to the housing in a position to receive cut grass blown outwardly of the housing through the port, said operating arm being positioned to press forwardly against the said closure to swing it against said bias forwardly and downwardly upon the operating arm being positioned to intrude into the housing through said port for opening of said port upon mounting of the collector on the mower housing.

9. The combination claimed in claim 8, and in which said operating arm is located to engage the said closure along a side marginal portion of the closure, and in which said operating arm includes a roller on its free end for rollingly engaging the closure.

10. The combination claimed in claim 8 and in which the collector has a forwardly directed open frame pivotally connectable to the housing near the lower portion of the said housing wall and releasably secured to the housing near the upper portion of the said housing wall.

11. The combination claimed in claim 8 and in which the collector has a forwardly directed open frame pivotally connectable to the housing near the upper portion of the said housing wall and releasably secured to the housing near the bottom portion of the said housing wall.

* * * * *